United States Patent Office 3,684,442
Patented Aug. 15, 1972

3,684,442
PROCESS FOR REMOVING CARBON DIOXIDE FROM A CRUDE AMMONIA SYNTHESIS GAS IN A COMBINED SYSTEM FOR PRODUCING AMMONIA AND UREA
Keizo Konoki, Yachiyo, and Kozo Ohsaki, Funabashi, Japan, assignors to Toyo Engineering Corporation and Mitsu Toatsu Chemicals, Inc., Tokyo, Japan
Filed Feb. 6, 1970, Ser. No. 9,148
Claims priority, application Japan, Feb. 8, 1969, 44/9,581
Int. Cl. C01c 1/04; C01b 2/30; C07c 127/00
U.S. Cl. 423—359                     9 Claims

ABSTRACT OF THE DISCLOSURE

A crude ammonia synthesis gas is passed through a scrubbing zone in which it is contacted by a scrubbing solution comprising liquid ammonia and a substance for assisting the dissolution of ammonia carbamate, with the ammonia being supplied at a rate so that the molar ratio of $NH_3/CO_2$ in the scrubbing solution adjacent the discharge end of the scrubbing zone is at least 3.0:1, preferably 4.0:1 to 20.0:1. Residual carbon dioxide in the ammonia synthesis gas leaving the scrubbing zone can be removed by adding water or an aqueous solution thereto and/or by subjecting said gas to a methanization reaction. Heat is removed from said gas, by indirect heat exchange, only after substantially all of the carbon dioxide has been removed therefrom.

BACKGROUND OF THE INVENTION

Field of the invention

This invention relates to an improved process for removing carbon dioxide in a combined system for production ammonia and urea.

Description of the prior art

Processes for synthesizing urea wherein an ammonia synthesizing system and a urea synthesizing system are combined together have been disclosed in Japanese Pat. No. 461,396 (Patent publication No. 6,332/1965) and Japanese Pat. No. 499,095 (Patent publication No. 3,291/1967). These processes comprise contacting crude ammonia synthesis gas, containing carbon dioxide, with liquid ammonia, which has been mixed with a medium for assisting the dissolution of ammonium carbamate, under a pressure of at least the pressure of the urea synthesis, to convert substantially the entire quantity of carbon dioxide in the crude ammonia synthesis gas into the liquid phase and thereafter maintaining the thus obtained liquid at the temperature of the urea synthesis.

According to these processes, the stage of scrubbing crude ammonia synthesis gas with an alkaline scrubbing medium and the stage of regenerating the alkaline scrubbing medium employed in conventional ammonia production systems can both be omitted by including a stage of removing carbon dioxide contained in the crude ammonia synthesis gas in the stage of synthesizing urea. Consequently, the manufacturing cost can be remarkably lowered.

This invention improves the above processes and provides a process for removing carbon dioxide by an even further simplified apparatus and in which a scrubbing zone of enhanced reliability can be used.

After investigating the above processes, we have found that further technical problems remain to be solved, namely, problems in the stage of scrubbing the crude ammonia synthesis gas and also in the following stage.

We have found that in order to increase the absorption of carbon dioxide in the stage of scrubbing the crude ammonia synthesis gas and also to minimize the quantity of gaseous ammonia which accompanies the ammonia synthesis gas leaving the scrubbing stage, it is desirable to maintain the temperature of the scrubbing solution in the scrubbing zone as low as possible, and the ammonia synthesis gas leaving the scrubbing zone must be cooled by indirect heat exchange in any event.

We have also found that an especially difficult problem involves the cooling of the ammonia synthesis gas by means of indirect heat exchange.

As processes for cooling by means of indirect heat exchange, there have been proposed several processes, namely, a process in which a heat exchanger is provided in the scrubbing zone for the crude ammonia synthesis gas to cool the scrubbing zone, a process in which a part of the scrubbing medium used in the scrubbing zone is taken out from the zone, cooled by being passed through a heat exchanger and thereafter returned to the scrubbing zone, or a process in which the ammonia synthesis gas flowing from the scrubbing zone is passed through a heat exchanger so as to be cooled whereby a large quantity of gaseous ammonia which accompanies the crude ammonia synthesis gas is condensed so that liquid ammonia can be separated therefrom and thereafter, the liquid ammonia can be returned to the scrubbing zone to cool the zone.

However, it is to be noted that in the former two processes, both heat exchangers are exposed to a fluid containing highly corrosive ammonium carbamate, and therefore, the heat exchangers must be made from a quite expensive material such as stainless steel containing special constituents, such as titanium or zirconium.

Further, in cooling a scrubbing medium using such an expensive heat exchanger, there is a serious risk, due to the presence of ammonium carbamate which easily coagulates at a low temperature in the scrubbing medium, that a large quantity of ammonium carbamate may coagulate in the heat exchanger and block up the heat exchanger if the temperature of the coolant in the heat exchanger is relatively low.

Thus, a coolant of a low temperature cannot be used in such a heat exchanger, and consequently, the quantity of heat recovered in the heat exchanger cannot be large.

In the latter process wherein the cooling is effected by condensing gaseous ammonia from the scrubbing zone to obtain liquid ammonia and returning the liquid ammonia to the scrubbing zone, the quantity of carbon dioxide introduced in the heat exchanger is small as compared with the above two processes, but if the scrubbing stage is carried out under nonsteady state conditions, for example, at the "start-up" of the process, a considerably large quantity of carbon dioxide sometimes enters into the heat exchanger. Thus, the above problems are not solved.

The above-mentioned problems result from the operation of removing carbon dioxide under such special conditions that the quantity of gaseous ammonia which accompanies the ammonia synthesis gas leaving the scrubbing zone would also be made a minimum.

According to the process of the present invention, it is possible to seize or absorb completely the carbon dioxide in a manner which is quite easy to practice, the heat exchanger required for removing or recovering the heat discharged in the scrubbing zone of the crude ammonia synthesis gas can be made from an ordinary inexpensive carbon steel, it is possible to avoid completely the risk of ammonium carbamate clogging the heat exchanger; and it is possible to maximize the quantity of heat recovered with the heat exchanger.

SUMMARY OF THE INVENTION

This invention provides a process for removing carbon dioxide in a combined system for producing ammonia and urea wherein crude ammonia synthesis gas containing carbon dioxide is scrubbed with liquid ammonia, together with a medium for assisting the dissolution of ammonium carbamate, to remove carbon dioxide contained in the crude ammonia synthesis gas. The quantity of ammonia is adjusted so that the molar ratio of $NH_3/CO_2$ of liquid phase in the ammonia synthesis gas at the gas discharge end of the scrubbing zone may be above 3.0:1, preferably 4.0–20:1, to assure the seizure of carbon dioxide. The crude ammonia synthesis gas is scrubbed, but there is no cooling of the synthesis gas by means of an indirect heat exchanger at a position where carbon dioxide is present or may be present, in the scrubbing zone or in a stage following the scrubbing zone. The ammonia synthesis gas containing gaseous ammonia is flowed from the scrubbing zone, any carbon dioxide coming out from the scrubbing zone with the ammonia synthesis gas is removed either by adding a small quantity of water into the ammonia synthesis gas or by carrying out a methanization reaction of carbon oxides with hydrogen and, finally, the ammonia synthesis gas is cooled by means of indirect heat exchange.

According to the process of this invention, the removal of carbon dioxide can be accomplished by a simple and reliable means, instead of using heat exchangers having the many defects referred to above, and the ammonia coming from the scrubbing zone can be recovered at a position where substantially no carbon dioxide exists.

If the heat exchanger is not used at a position where ammonia and carbon dioxide are coexisting and there is a danger of forming ammonium carbamate, the temperature of the scrubbing zone increases to develop a tendency for carbon dioxide to escape from the scrubbing zone.

According to the process of this invention, this tendency is prevented by maintaining a high molar ratio of $NH_3/CO_2$ of the scrubbing solution at the gas discharge end of the scrubbing zone.

The inventors have confirmed in experiments that the escape of carbon dioxide can be prevented substantially completely if the molar ratio of $NH_3/CO_2$ is made higher than 4.0, instead of maintaining the scrubbing zone at a low temperature.

However, in this case, a large quantity of gaseous ammonia flows out from the scrubbing zone, and so it is necessary to recover the gaseous ammonia at a position where substantially no carbon dioxide is existing.

As described above, the escape of carbon dioxide from the scrubbing zone may be prevented by controlling the supply of ammonia so that the molar ratio of $NH_3/CO_2$ of the scrubbing zone may be high, but during the "starting-up" period or if the pump for the scrubbing solution is in a bad condition, the control of the molar ratio of $NH_3/CO_2$ of the scrubbing solution is difficult, and consequently carbon dioxide may escape from the scrubbing zone.

It is necessary to remove carbon dioxide which escapes under such nonsteady-state conditions, and it is desirable to effect the removal of gaseous ammonia after the removal of the carbon dioxide.

According to the process of the present invention, a small quantity of water which contains little or no carbon dioxide is contacted with the ammonia synthesis gas coming from the scrubbing zone to dissolve a part of the large quantity of gaseous ammonia contained in the ammonia synthesis gas thereby to obtain aqueous ammonia of a high concentration and the removal of the carbon dioxide is effected with the aqueous ammonia, or otherwise. The ammonia synthesis gas coming out from the scrubbing zone can also be directly introduced into a reactor for a methanization reaction to convert any carbon dioxide present, simultaneously with carbon monoxide, into methane.

The removal of carbon dioxide is completed in the above described manner. Thereafter, the ammonia synthesis gas is cooled to condense a large quantity of gaseous ammonia, coming out from the scrubbing zone thereby recovering it into the form of liquid ammonia.

In the cooling stage, there is no possibility of ammonium carbamate clogging the heat exchanger required for the cooling and said heat exchanger can be made from ordinary carbon steel.

In the removal of ammonia after the above methanization reaction, it is possible to recover heat created in the scrubbing zone together with the heat of the methanization reaction, and if desired, it is also possible to recover heat created in the scrubbing zone together with heat of the methanization reaction and the heat of the ammonia synthesizing reaction by introducing the ammonia synthesis gas directly into a circulating system for the ammonia synthesis gas after the methanization reaction. Consequently, it is possible to reduce the number of heat exchangers required in the system. Thus, the process is quite advantageous as regards the construction expense and the maintenance of the heat exchangers.

In case the ammonia synthesis gas coming out from the scrubbing zone is directly introduced in a methanization reactor, it is necessary to introduce the ammonia synthesis gas into the methanization reactor at such an ammonia concentration that the gaseous ammonia contained in the ammonia synthesis gas may be not decomposed into hydrogen and nitrogen under the operation conditions in the methanization reactor, i.e. at a temperature of 275–350° C. under a pressure of 150–400 atms. The control of the ammonia concentration may be effected sufficiently by selecting a suitable operation pressure in the scrubbing zone.

A methanization catalyst for carbon oxides is generally a solid catalyst containing nickel as the main ingredient. It has been found by experiments that such a catalyst can be used without any difficulty in its activity and life even in an atmosphere containing ammonia.

DESCRIPTION OF THE PREFERED EMBODIMENTS

Figure 1:
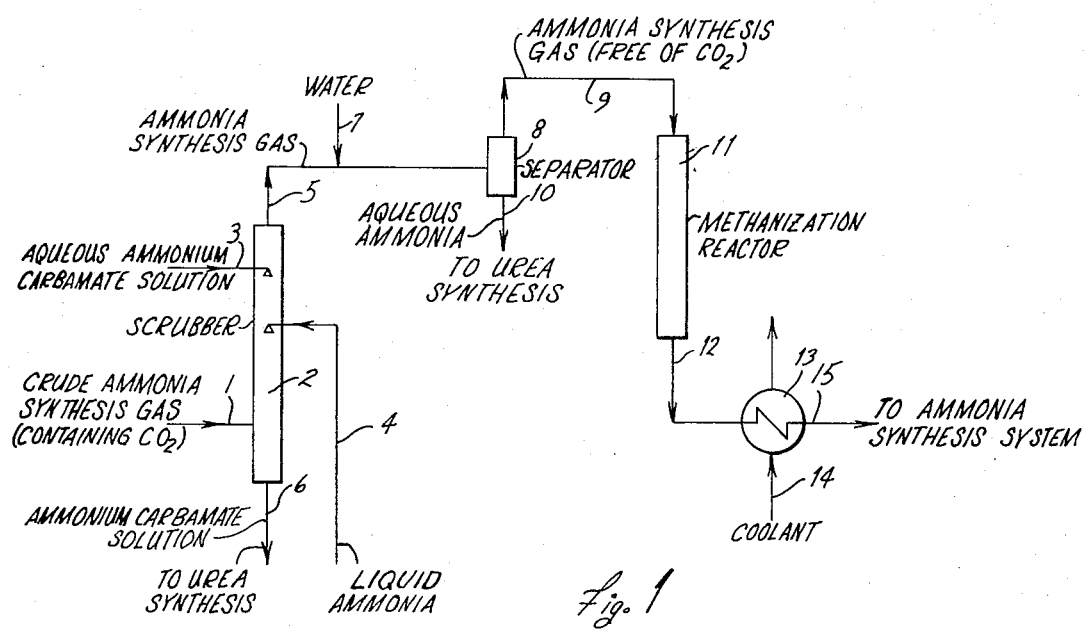
FIG. 1 is a schematic view of a system for carrying out the present invention.

Referring to FIG. 1, a gaseous mixture, containing carbon dioxide, to be used for synthesizing ammonia is fed through a pipe 1 into the lower end of a scrubbing tower 2. An aqueous solution of ammonium carbamate is introduced into the tower 2 through a pipe 3 to scrub the gas. The pressure in the tower 2 is in the range of 150–400 atms. The molar ratio of $NH_3/CO_2$ of the scrubbing solution at the top of the tower is controlled so as to be above 3.0, preferably 4.0–20, by introducing liquid ammonia through a pipe 4. Substantially the whole quantity of carbon dioxide in the raw gaseous mixture is transferred into the liquid phase in the tower 2.

Ammonium carbamate solution formed by the transfer of carbon dioxide into the liquid phase is introduced into a reactor for the urea synthesis (not shown) through a pipe 6.

The ammonia synthesis gas exiting from the tower 2 and containing a large quantity of ammonia flows through a pipe 5 and therein it is mixed with a small quantity of water introduced through a pipe 7 whereby a part of the ammonia is absorbed in the water to yield aqueous ammonia in the ammonia synthesis gas mixture.

Due to the heat of absorption generated by the formation of aqueous ammonia, the temperature of the raw gaseous mixture is elevated by 0–50° C.

Instead of introducing water through the pipe 7, another aqueous solution, such as aqueous ammonia, can be used. In this case, the aqueous solution should not contain carbon dioxide at all or it may contain only a small quantity thereof.

Aqueous ammonia formed in the ammonia synthesis gas in the pipe 5 seizes any carbon dioxide remaining in the ammonia synthesis gas and thereafter the liquid phase is separated from the gaseous phase in a separator 8. The liquid phase is sent to a urea synthesis system or the like (not shown) through a pipe 10.

In the stages described above, carbon dioxide is removed completely during nonsteady-state conditions.

The supply of the small quantity of water through pipe 7 can be stopped when the operation is carried out under steady-state conditions and no carbon dioxide flows out from the scrubbing zone 2.

The gaseous mixture leaving the separator 8 flows through a pipe 9 and is introduced in a methanization reactor 11, where carbon monoxide contained in the ammonia synthesis gas is reacted with hydrogen also contained in the ammonia synthesis gas at a temperature of around 300° C. in the presence of an ordinary methanization catalyst containing nickel to convert it into methane which is inert to the catalyst for the following ammonia synthesis procedure.

As a result of the heat generated by the exothermic methanization reaction, the gaseous mixture flowing through a pipe 12 is introduced in a heat exchanger 13 at a temperature 15–30° C. higher than when it enters the methanization reactor. In the heat exchanger 13, the gaseous mixture is subjected to heat exchange with a heat transfer medium, such as boiler feed water, supplied through a pipe 14, whereby it is cooled to about 60° C. and then is sent to the ammonia synthesis system (not shown) through a pipe 15.

Ammonia in the ammonia synthesis gas coming out from the scrubbing tower 2 through the pipe 5 is recovered in the form of liquid ammonia together with ammonia newly synthesized from hydrogen and nitrogen in the subsequent ammonia synthesis system.

In FIG. 1, the ammonia synthesis gas can be introduced in a further heat exchanger and cooled at an appropriate portion in the pipe 9 between the separator 8 and the methanization reactor 11 in order to recover gaseous ammonia contained in the ammonia synthesis gas as liquid ammonia. The purpose of the present invention can also be attained in this manner.

Figure 2:
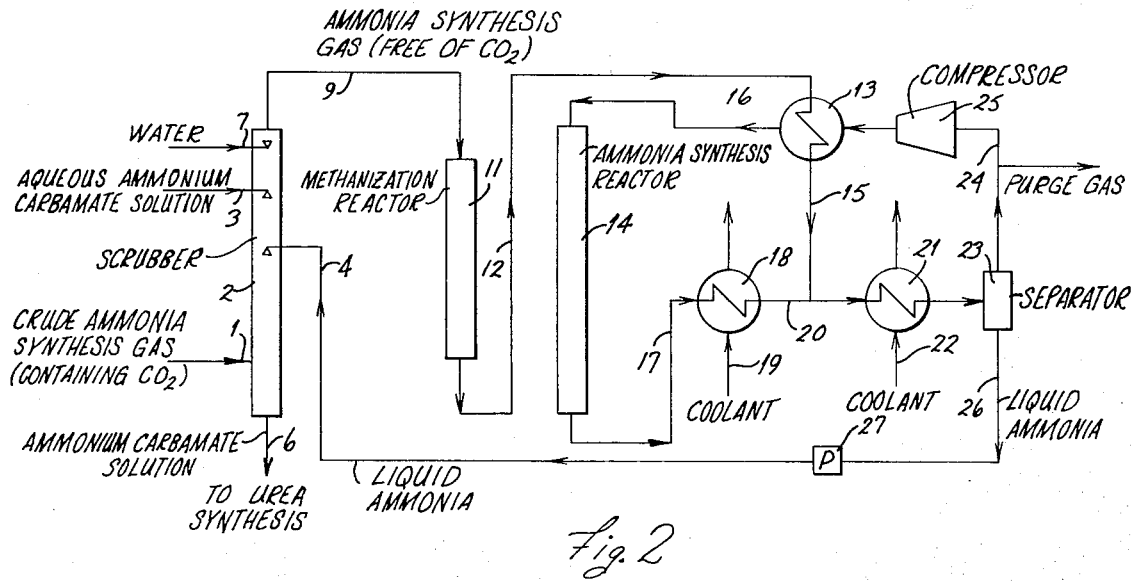
FIG. 2 is a schematic view of a modified system.

Referring to FIG. 2, ammonia synthesis gas, containing carbon dioxide, to be used for ammonia synthesis is supplied to the bottom of a scrubbing tower 2 through a pipe 1. While the mixture ascends in the scrubbing tower 2, it is scrubbed with an aqueous solution of ammonium carbamate introduced through a pipe 3 and liquid ammonia introduced through a pipe 4 to remove the major part of the carbon dioxide contained therein, which $CO_2$ is converted into the liquid phase.

At this time, liquid ammonia introduced from the pipe 4 is supplied in such a manner that the molar ratio of $NH_3/CO_2$ of the scrubbing solution around the top of the tower may be controlled to be in the range of 4.0–20.

Ammonium carbamate solution formed in the scrubbing tower 2 is fed from the bottom of the tower to a reactor for urea synthesis (not shown) through a pipe 6.

The ammonia synthesis gas from which carbon dioxide has been removed in the scrubbing tower 2 is introduced into a methanization reactor 11 through a pipe 9 and the carbon monoxide contained therein is catalytically converted with hydrogen into methane.

If carbon dioxide flows out from the scrubbing tower 2 under nonsteady-state conditions, such as at the "start-up" of the process, the carbon dioxide is also converted with hydrogen contained in the ammonia synthesis gas mixture into methane in the methanization reactor 11.

Thereafter, it is introduced into a preheater 13 for the circulating gas in the ammonia synthesis system through a pipe 12.

The major part of heat added to the ammonia synthesis gas in the scrubbing tower 2 and the heat generated in the methanization reaction is transferred to the circulating gas flow in the ammonia synthesis system by means of heat exchange and the heated circulating gas enters into an ammonia synthesis reactor 14.

The incoming ammonia synthesis gas cooled in the preheater 13 is introduced into the ammonia synthesis system through a pipe 15.

The circulating gas for the ammonia synthesis, after being heated in the preheater 13, is introduced into the ammonia synthesis reactor 14 through a pipe 16 and is formed into ammonia therein in a conventional manner. Due to the exothermic nature of the ammonia synthesis reaction, the temperature of the circulating gas flowing out from the reactor 14 is elevated by 100–200° C.

Therefore, the circulating gas exiting from the reactor 14 is introduced into a device for recovering heat 18 through a pipe 17. In the device 18, the heat generated in (1) the scrubbing tower 2, (2) the methanization reactor 11 and (3) the ammonia synthesis reactor 14 are recovered intensively for preheating boiler feed water or for generating steam.

The flow of circulating gas leaving the heat recovery device 18 flows through a pipe 20 and therein is combined with the incoming ammonia synthesis gas from the pipe 15 and enters into a condenser for recovering ammonia 21. In the condenser 21, the gaseous mixture is cooled with a coolant introduced through a pipe 22 to condense a major part of the ammonia in the flow of circulating gas, namely, a major part of the ammonia introduced from the scrubbing tower 2 as well as ammonia newly synthesized in the ammonia synthesis reactor 14. The mixture is then introduced in a separator 23 to separate liquid ammonia.

The flow of circulating gas leaving the separator 23 through a pipe 24 has its pressure elevated by a compressor 25 to regain the pressure lost in the ammonia synthesis stage, and thereafter the gas enters the ammonia synthesis reactor 14 through the preheater 13.

A portion of the liquid ammonia separated in the separator 23 is fed by a pump 27 through a pipe 26 and is elevated in pressure. Then, the ammonia is introduced in the scrubbing tower through the pipe 4.

The process of the present invention will be illustrated below by way of example.

EXAMPLE

The composition of the crude ammonia synthesis gas supplied in the scrubbing tower 2 was as follows (in volume percent):

| | |
|---|---|
| $CO_2$ | 11.28 |
| $H_2$ | 66.30 |
| CO | 0.38 |
| $N_2$ | 21.57 |
| $CH_4$ | 0.21 |
| A | 0.27 |

The crude ammonia synthesis gas of the above composition was fed in at a rate of 695 Nm.³/hour and was scrubbed with 276.5 kg./hour of ammonia carbamate solution and 385 kg./hour of liquid ammonia under a pressure of 250 kg./cm.² to yield the following composition (in volume percent):

| | |
|---|---|
| $H_2O$ | 1.00 |
| CO | 0.30 |
| $N_2$ | 17.48 |
| $NH_3$ | 27.00 |
| $CH_4$ | 0.29 |
| A | 0.24 |
| $CO_2$ | Trace |
| $H_2$ | 53.68 |

The molar ratio of $NH_3/CO_2$ of the scrubbing solution at the gas discharge end of the scrubbing tower 2 (i.e. around the top of the tower) was about 8.0.

Under steady-state conditions, the ammonia synthesis gas left the scrubbing tower 2 with the above composition, but, on the other hand, under nonsteady-state conditions, the carbon dioxide may increase to approximately 0.1-0.5 volume percent.

The removal of any carbon dioxide remaining in the gas leaving the tower 2 was effected with aqueous ammonia obtained by feeding 6.5-25 kg./hour of water through a pipe 7 to form an aqueous ammonia solution of a concentration of about 45 weight percent in the ammonia synthesis gas, in the operation as shown in FIG. 1.

In the operation as shown in FIG. 2, the removal of residual carbon dioxide in the ammonia synthesis gas was effected by the methanization reaction of the carbon dioxide in the methanization reactor 11.

Thus, any carbon dioxide in the ammonia synthesis gas was removed substantially completely, and consequently, the heat exchanger 13 in FIG. 1 and the heat exchanger 13 in FIG. 2 could both be made from ordinary carbon steel without any trouble.

Moreover, as described below, the recovery of heat can be carried out, using those heat exchangers, at a high efficiency.

As shown in FIG. 1, when boiler feed water at 45° C. was preheated in the preheater 13, after the ammonia synthesis gas left the methanization reactor 11, heat recovery of $52.3 \times 10^3$ kcal./hour was obtained.

When a heat exchanger was provided at an appropriate portion of the pipe 9 to recover heat, heat recovery of about $45 \times 10^3$ kcal./hour was obtained.

When heat was recovered in the circulating system for the ammonia synthesis gas as shown in FIG. 2, the flow of the circulating gas at normal temperature was preheated up to 90° C., with incoming ammonia synthesis gas at 143° C., in the preheater 13. The circulating gas then entered the ammonia synthesis reactor 14, and the temperature was elevated to 240° C. by the heat of reaction of the ammonia formation.

By utilizing the flow of the circulating gas leaving the ammonia synthesis reactor 14 for preheating boiler feed water in the heat recovery device 18, a heat recovery of $189.6 \times 10^3$ kcal./hour was obtained.

The details of the heat recovered are as follows:

|  | Kcal./hour |
|---|---|
| Heat generated in the scrubbing tower 2 | $46.7 \times 10^3$ |
| Heat generated in the methanization reactor 11 | $7.0 \times 10^3$ |
| Heat generated in the ammonia synthesis reactor 14 | $135.9 \times 10^3$ |

The embodiments of the invention in which an exclusive property or privilege is claimed are defined as follows:

1. A process for removing carbon dioxide from a crude ammonia synthesis gas containing hydrogen, nitrogen and carbon dioxide, comprising the steps of feeding said crude ammonia synthesis gas into a scrubbing zone maintained at a pressure of at least about 150 atms. and passing said gas through said zone toward the gas discharge end thereof, feeding into said zone and into contact with said crude ammonia synthesis gas, scrubbing liquid consisting essentially of liquid ammonia and an aqueous liquid medium capable of dissolving ammonium carbamate in order to absorb in the liquid phase in said zone substantially all of the carbon dioxide in the crude ammonia synthesis gas whereby to obtain at the discharge end of said zone a purified ammonia synthesis gas, the liquid ammonia being fed into said zone at a rate such that the molar ratio of $NH_3/CO_2$ in the liquid phase adjacent the gas discharge end of the scrubbing zone is at least about 3.0:1, the scrubbing of said crude ammonia synthesis gas being carried out without cooling the contents of the scrubbing zone; removing the liquid phase from the scrubbing zone for use in a urea synthesis reaction; removing the purified ammonia synthesis gas from the gas discharge end of the scrubbing zone; cooling said purified ammonia synthesis gas free of carbon dioxide by indirect heat exchange and then subjecting said purified gas to an ammonia synthesis reaction.

2. The process according to claim 1, in which the molar ratio of $NH_3/CO_2$ in the scrubbing solution adjacent said discharge end of said zone is maintained in the range of from about 4.0:1 to 20.0:1.

3. The process according to claim 1, including the step of adding liquid absorbent selected from the group of water and an aqueous solution of ammonia substantially free of $CO_2$ to the purified ammonia synthesis gas after it has been discharged from the scrubbing zone and before it is cooled, in order to remove residual carbon dioxide from the purified ammonia synthesis gas, and then separating said liquid absorbent from the purified ammonia synthesis gas.

4. The process according to claim 1, including the step of subjecting the ammonia synthesis gas to a methanization reaction after said gas has been discharged from the scrubbing zone and before said gas is cooled, in order to convert residual carbon dioxide in the ammonia synthesis gas into methane.

5. The process according to claim 3, in which after the liquid absorbent has been separated from the purified ammonia synthesis gas, said gas is then subjected to a methanization reaction before it is cooled by indirect heat exchange.

6. The process according to claim 5, in which the purified ammonia synthesis gas leaving the separation step is subjected to cooling prior to the methanization reaction in order to condense liquid ammonia which is then separated from the ammonia synthesis gas.

7. The process according to claim 4, in which the ammonia synthesis gas leaving the methanization reaction is flowed in indirect heat exchange relationship with gas circulating in an ammonia synthesis system to transfer heat to the circulating gas as it is about to enter an ammonia synthesis reactor, the ammonia synthesis gas then being added to said circulating gas at a location downstream of the ammonia synthesis reactor.

8. The process according to claim 7, including the steps of cooling the circulating gas exiting from the ammonia synthesis reactor both before and after the ammonia synthesis gas is added thereto in order to condense ammonia gas and then separating the liquidfied ammonia from the circulating gas.

9. The process according to claim 8, including the steps of elevating the pressure of the circulating gas after the liquified ammonia is separated and before the circulating gas is heated by the incoming ammonia synthesis gas, and forwarding at least a part of the liquified ammonia to the scrubbing zone.

References Cited

UNITED STATES PATENTS

| 1,202,995 | 10/1916 | Haber et al. | 23—199 |
| 1,889,934 | 12/1932 | Richardson | 23—198 |
| 2,801,151 | 7/1957 | Nelson | 23—2 R |
| 3,193,353 | 7/1965 | Matile et al. | 23—2 R |

OSCAR R. VERTIZ, Primary Examiner

H. S. MILLER, Assistant Examiner

U.S. Cl. X.R.

423—232; 260—555 R